(12) United States Patent
Basfar et al.

(10) Patent No.: US 7,947,768 B2
(45) Date of Patent: May 24, 2011

(54) ULTRAVIOLET (UV) RADIATION STABILITY AND SERVICE LIFE OF WOVEN FILMS OF POLYPROPYLENE (PP) TAPES FOR THE PRODUCTION OF JUMBO BAGS

(75) Inventors: Ahmed Ali Basfar, Riyadh (SA); Khondoker Muhammad Idriss Ali, Riyadh (SA); Milind M. Vaidya, Dhahran (SA); Ahmed Abdullah Bahamdan, Dammam (SA)

(73) Assignee: Saudi Arabian Oil Company (SA)

( * ) Notice: Subject to any disclaimer, the term of this patent is extended or adjusted under 35 U.S.C. 154(b) by 344 days.

(21) Appl. No.: 12/396,343

(22) Filed: Mar. 2, 2009

(65) Prior Publication Data

US 2010/0222470 A1    Sep. 2, 2010

(51) Int. Cl.
*C08K 5/3435* (2006.01)
(52) U.S. Cl. ......... 524/99; 524/107; 524/186; 524/282; 524/287; 524/323; 524/570
(58) Field of Classification Search .................. 524/99, 524/107, 186, 282, 287, 323, 570
See application file for complete search history.

(56) References Cited

U.S. PATENT DOCUMENTS

| | | | |
|---|---|---|---|
| 4,590,231 | A | 5/1986 | Seltzer et al. |
| 4,668,721 | A | 5/1987 | Seltzer et al. |
| 4,876,300 | A | 10/1989 | Seltzer et al. |
| 5,134,181 | A | 7/1992 | Masina |
| 5,597,857 | A | 1/1997 | Thibaut et al. |
| 6,881,772 | B2 | 4/2005 | Gugumus |
| 7,138,448 | B2 | 11/2006 | Kaprinidis et al. |
| 2002/0016390 | A1 | 2/2002 | Gugumus |
| 2002/0120041 | A1 | 8/2002 | Zingg et al. |
| 2003/0013785 | A1 | 1/2003 | Gugumus |
| 2005/0085574 | A1 | 4/2005 | Gijsman et al. |
| 2005/0107502 | A1 | 5/2005 | Kim |
| 2006/0197069 | A1 | 9/2006 | Capocci et al. |
| 2007/0111319 | A1 | 5/2007 | Bastide et al. |
| 2007/0135537 | A1 | 6/2007 | Bonora |
| 2009/0043012 | A1* | 2/2009 | Easter .................... 523/173 |

FOREIGN PATENT DOCUMENTS

| | | |
|---|---|---|
| EP | 1038911 A1 | 9/2000 |
| EP | 1113039 B1 | 7/2001 |
| WO | 2005/005582 A1 | 1/2005 |
| WO | 2007088114 A1 | 8/2007 |
| WO | 2008012236 A1 | 1/2008 |

OTHER PUBLICATIONS

International Search Report for PCT/US2010/025021 dated May 7, 2010.
Messing et al., "Ceramic Powder Synthesis by Spray Pyrolysis," Journal of the American Ceramic Society, vol. 76, No. 11, pp. 2707-2726 (1993).
Skrabalak et al., "Porous MoS2 Synthesized by Ultrasonic Spray Pyrolysis," Journal of the American Chemical Society, vol. 127, No. 28, pp. 9990-9991 (Jun. 25, 2005).
Choi et al., "Preparation and characterization of nano-sized CoMo/Al2O3 catalyst for hydrodesulfurization," Applied Catalysis A: General 260, pp. 229-236 (2004).
Okuyama et al., "Preparation of nanoparticles via spray route," Chemical Engineering Science, vol. 58, pp. 537-547 (2003).
Mizushima et al., "Preparation of Silica-supported Nickel Catalyst by Fume Pyrolysis: Effects of Preparation Conditions of Precursory Solution on Porosity and Nickel Dispersion," Journal of the Japan Petroleum Institute, vol. 48, No. 2, pp. 90-96 (2005).
Uematsu et al., "New application of spray reaction technique to the preparation of supported gold catalysts for environmental catalysis," Journal of Molecular Catalysis A: Chemical 182-183, pp. 209-214 (2002).
Choi et al., "Preparation of CO2 Absorbent by Spray Pyrolysis," Chemistry Letters, vol. 32, No. 10, pp. 924-925 (2003).

* cited by examiner

*Primary Examiner* — Robert D. Harlan
(74) *Attorney, Agent, or Firm* — Bracewell & Giuliani LLP

(57) ABSTRACT

This invention relates woven jumbo polypropylene bags manufactured from a polypropylene resin that includes a low molecular weight hindered amine light stabilizer, a high molecular weight hindered amine light stabilizer, a first antioxidant, and a second antioxidant. Also provided are methods for the preparation of woven jumbo polypropylene bags.

25 Claims, 2 Drawing Sheets

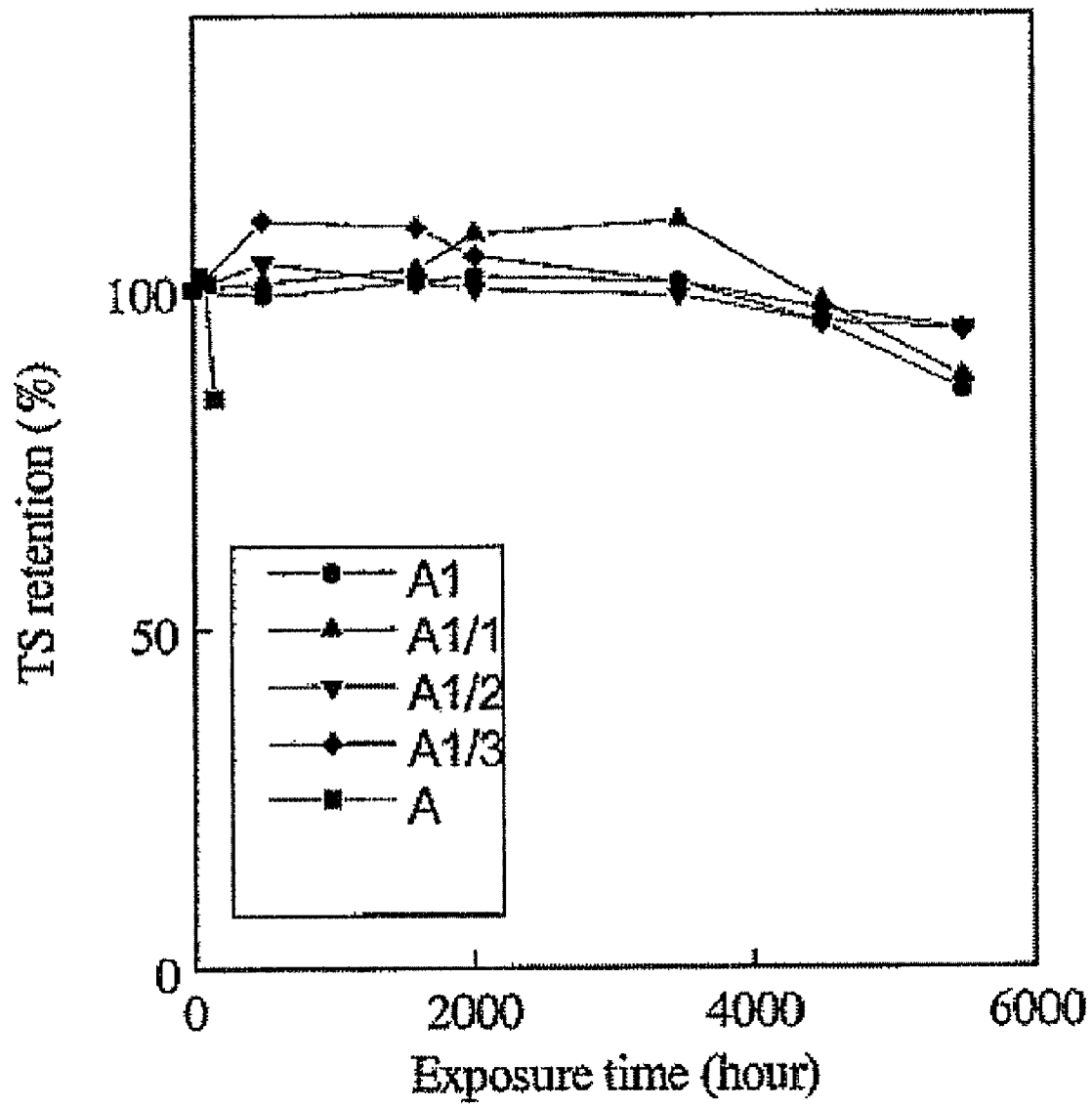
Fig. 1 TS retention (%) for stretched PP (A) films (i.e. A1/1 - A1/3) after accelerated weathering by Q-UV.

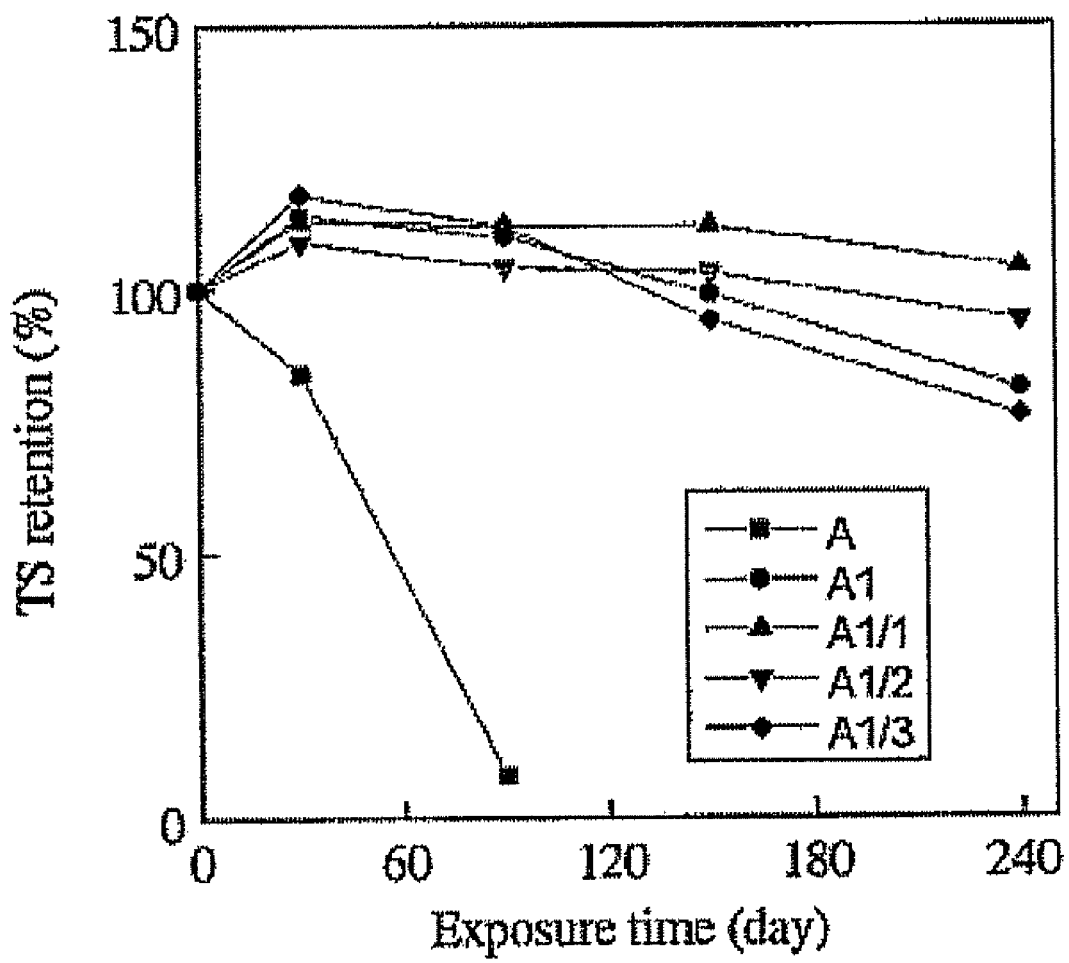
Fig. 2 TS retention (%) for stretched PP films (i.e. A1/1 - A1/3) after natural (outdoor) weathering.

ULTRAVIOLET (UV) RADIATION STABILITY AND SERVICE LIFE OF WOVEN FILMS OF POLYPROPYLENE (PP) TAPES FOR THE PRODUCTION OF JUMBO BAGS

BACKGROUND OF THE INVENTION

1. Technical Field of the Invention

This invention generally relates to a polyolefin resin and articles prepared from the polyolefin resin. More specifically, the invention relates to a polypropylene resin exhibiting improved ultraviolet (UV) radiation stability and articles prepared therefrom.

2. Description of the Prior Art

Polyolefin resins are used in a variety of applications due to the ease of use in the manufacturing of a variety of extruded and molded articles. Jumbo bags are an exemplary article that may be prepared from polyolefin resins, which are useful in a variety of applications, including the transport, handling, storage and packaging of bulk materials, including materials having a lumpy or fine consistency. These articles can be used in the transport and storage of a variety of materials, including bulk quantities of petrochemical products, fertilizers, cement, sand, minerals, grains, feeds, seeds, mineral salts, solid chemicals, sugar, and the like. The bags can be used to carry loads up to 3 tons.

However, jumbo bags prepared from polypropylene resins frequently suffer from loss of the tensile strength and general instability due to exposure to UV radiation, particularly in outdoor applications where the bags may be exposed to prolonged sunlight. As the tensile strength of the bags decreases, the failure rate of the bags increases, thereby decreasing the service life of the bags and reducing the overall usefulness of the bags.

Thus, there exists a need for the development of a polyolefin resin, particularly a polypropylene resin, and articles prepared therefrom, having improved UV stability and increased lifetimes.

SUMMARY OF THE INVENTION

The invention provides a polypropylene resin for the preparation of articles having improved UV stability. Also provided are methods of manufacturing the same.

In one aspect, a stretched polypropylene film is provided. The stretched polypropylene film includes a polypropylene resin, that includes polypropylene, a low molecular weight hindered amine light stabilizer, a high molecular weight hindered amine light stabilizer, a first antioxidant, and a second antioxidant. The polypropylene film is stretched to a ratio of between approximately 1:7 and 1:5 to produce the stretched polypropylene film.

In certain embodiments, the low molecular weight hindered amine light stabilizer, the high molecular weight hindered amine light stabilizer, the first antioxidant, the second antioxidant, and any other additive make up less than about 1% of the polypropylene resin by weight. In certain other embodiments, the polypropylene resin is extruded to produce a polypropylene film, and the polypropylene film is stretched at a ratio of between about 1:5 and 1:9 to produce polypropylene tapes. In certain embodiments, the polypropylene film can be woven to prepare the woven polypropylene bags. In certain other embodiments, the polypropylene resin is extruded into a film at a temperature of between about 220° and 250° C. In certain other embodiments, the polypropylene resin further includes calcium stearate. In certain embodiments, the stretched polypropylene films can be woven to prepare jumbo polypropylene bags, and the bags can include a polymer liner.

In certain other embodiments, the polypropylene resin can include at least two antioxidants, wherein the first antioxidant is a hindered phenolic antioxidant and the second antioxidant is a phosphite ester.

In certain embodiments, the low molecular weight hindered amine light stabilizer can be bis-(2,2,6,6-tetramethyl-4-piperidinyl)-decanedioate. In certain embodiments, the high molecular weight hindered amine light stabilizer can be poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]].

In another aspect, a method for preparing a stretched polypropylene film is provided. The method includes the steps of extruding a polypropylene resin to form a polypropylene film. The polypropylene resin includes a polypropylene polymer, a low molecular weight hindered amine light stabilizer, a high molecular weight hindered amine light stabilizer, a first antioxidant, and a second antioxidant. The polypropylene resin is stretched to form the stretched polypropylene film.

In certain embodiments, the ratio of low molecular weight hindered amine light stabilizer to high molecular weight hindered amine light stabilizer is between about 1:5 and 1:9. In certain embodiments, the ratio of low molecular weight hindered amine light stabilizer to high molecular weight hindered amine light stabilizer is about 1:7. In certain embodiments, the low molecular weight hindered amine light stabilizer, the high molecular weight hindered amine light stabilizer, the primary antioxidant and the secondary antioxidant are included in the polypropylene resin in a total amount of less than about 1% by weight of the polypropylene resin. In certain embodiments, the polypropylene resin is extruded at a temperature of between about 220° and 250° C. to form stretched polypropylene films. In certain embodiments, a stretched polypropylene film is prepared by stretching the polypropylene film at a ratio of about 1:7.

In certain other embodiments, the polypropylene resin can include at least two antioxidants, wherein the first antioxidant is a hindered phenolic antioxidant and the second antioxidant is a phosphite ester.

In certain embodiments, the low molecular weight hindered amine light stabilizer can be bis-(2,2,6,6-tetramethyl-4-piperidinyl)-decanedioate. In certain embodiments, the high molecular weight hindered amine light stabilizer can be poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]].

BRIEF DESCRIPTION OF THE DRAWING

FIG. 1 is a graph showing tensile strength retention of polypropylene films upon accelerated weathering.

FIG. 2 is a graph showing tensile strength retention of polypropylene films after natural weathering.

DETAILED DESCRIPTION OF THE INVENTION

The present invention provides polyolefin resins having additives which provide for increased UV stability. Increased UV stability allows for prolonged exposure to sunlight, and increased overall lifetimes of products prepared from the resins disclosed herein. Particularly, preferred polyolefin resins include, for example, polypropylene, at least one hindered amine light stabilizer and at least one antioxidant. Articles prepared from the polypropylene resin prepared as described typically exhibit increased UV stability and increased lifetime.

Hindered Amine Light Stabilizers

Polymers prepared according to the present invention can include at least one hindered amine light stabilizer (hereinafter "HALS"). Typically, the HALS is added to the polypropylene resin and acts as a photon scavenger. Typically, the HALS reacts with UV light from sunshine to protect the bulk polymer matrix from photodegradation. The damaging radiation is absorbed by these additives and is typically converted into harmless heat.

The HALS can be oxidized to form a nitroxyl radical, which can then scavenge alkyl radicals in the bulk polymer leading to production of hydroxylamines. The hydroxylamines can in turn react with peroxyl radicals and, in turn, regenerate nitroxyl radicals. The cycling of nitroxyl radical formation is one benefit of using HALS, even at low concentrations. Most commercially available UV stabilizing HALS absorb UV radiation in the range of between about 300-360 nm, generally corresponding to the spectral region of sunlight that is typically responsible for causing substantial damages to polymers and articles prepared from polymers.

In certain embodiments, the molecular weight of the HALS can impact the performance of the resulting polypropylene compounds. The relative impact of the HALS on polypropylene films can depend on the sample form and exposure conditions. For example, in relatively thick polypropylene films where the protection of the polymer film surface is particularly important, there is a reduced performance of the HALS as the molecular weight of the stabilizer increases from approximately 500 g/mol to approximately 1000 g/mol. In contrast, for relatively thin polypropylene film samples the effect of the molecular weight of the HALS is less pronounced for the particular film thickness, but is nevertheless significant.

In addition, increased molecular weight of the HALS can result in decreased volatility and decreased diffusion rate through a polypropylene film. As a result, the performance of the HALS can reach a maximum at some particular molecular mass and their performance will decrease thereafter as the stabilizer mass increases beyond the particular molecular weight.

The UV stability and thermo-oxidative stability of polypropylene films were examined for polypropylene films that include a low molecular weight HALS, a high molecular weight HALS, a first antioxidant and a second antioxidant. Depending on the particular stabilizer, the UV and thermo-oxidative stabilities decreased as the molecular weight of the HALS increased. The decrease in UV and thermo-oxidative stability typically begins with number average molecular weight of the HALS of approximately 1000 g/mol. In certain embodiments, HALS having molecular weights up to 2000 or 3000 g/mol show a decrease in the UV and thermo-oxidative stability. The contribution of polymeric HALS to thermo-oxidative stability decreases as the molecular weight of the HALS reaches very high values, such as for example, at a molecular weight of greater than 5000 g/mol. However, the contribution of the HALS to the UV stability does not decrease with increasing molecular weight, in part due to the deactivation of catalyst residues or other species that may initiate UV degradation, but are inactive with respect to the initiation of thermo-oxidative degradation.

In certain preferred embodiments, the HALS useful for inclusion in the polypropylene resins described herein includes at least one piperidine functional group. Hindered light amine stabilizers having a piperidine functional group can be of relatively low molecular weight or of relatively high molecular weight. As used herein, low molecular weight HALS include monomeric compounds (i.e., not oligomeric or polymeric) having a molecular weight of less than about 1000 g/mol, preferably between about 200 and 800 g/mol. As used herein, high molecular weight HALS include oligomeric or polymeric compounds having a molecular weight of greater than about 1000 g/mol, preferably greater than about 1500 g/mol, and can be, in certain embodiments, up to about 20,000 g/mol.

In certain embodiments, the low molecular weight HALS can be selected from 2,2,6,6-tetramethyl-4-piperidon; 2,2,6,6-tetramethyl-4-piperidinol; bis-(1,2,2,6,6-pentamethylpiperidyl)-(3',5'-di-tert-butyl-4'-hydroxybenzyl)-butylmalonate; bis-(2,2,6,6-tetramethyl-4-piperidinyl)-decanedioate (Tinuvin® 770); bis-(2,2,6,6-tetramethyl-4-piperidinyl)-succinate (Tinuvin® 780); bis-(1-octyloxy-2,2,6,6-tetramethyl-4-piperidinyl)-sebacate (Tinuvin® 123); bis-(1,2,2,6,6-pentamethyl-4-piperidinyl)-sebacate (Tinuvin® 765); tetrakis-(2,2,6,6-tetramethyl-4-piperidyl)-1,2,3,4-butanetetracarboxylate; N,N'-bis-(2,2,6,6-tetramethyl-4-piperidyl)-hexane-1,6-diamine; N-butyl-2,2,6,6-tetramethyl-4-piperidinamine; 5-(2,2,6,6-tetramethyl-4-piperidinyl)-2-cyclo-undecyl-oxazole) (Hostavin®. N20); 1,1'-(1,2-ethane-di-yl)-bis-(3,3',5,5'-tetramethyl-piperazinone) (Goodrite® UV3034); 8-acetyl-3-dodecyl-7,7,9,9-tetramethyl-1,3,8-triazaspiro(4,5)decaan-2,4-dione (Tinuvin® 440); 1,2,3,4-butane-tetracarboxylic acid-1,2,3-tris(1,2,2,6,6-pentamethyl-4-piperidinyl)-4-tridecylester (Mark® LA62); N-2,2,6,6-tetramethyl-4-piperidinyl-N-amino-oxamide (Lucheme HAR100); 4-acryloyloxy-1,2,2,6,6-pentamethyl-4-piperidine; mixture of esters from 2,2,6,6-tetramethyl-4-piperidinol and fatty acids (Cyasorb® UV3853); propanedioic acid, [(4-methoxyphenyl)methylene]-bis(1,2,2,6,6-pentamethyl-4-piperidinyl) ester (Sanduvor® PR 31); formamide, N,N-1,6-hexanediylbis[N-(2,2,6,6-tetramethyl-4-piperidinyl (Uvinul® 4050H); 1,5-dioxaspiro(5,5)undecane 3,3-dicarboxylic acid, bis(2,2,6,6-tetramethyl-4-peridinyl)ester (Cyasorb® UV-500); 1,5-dioxaspiro(5,5)undecane 3,3-dicarboxylic acid, bis(1,2,2,6,6-pentamethyl-4-peridinyl)ester (Cyasorb® UV516); 3-dodecyl-1-(2,2,6,6-tetramethyl-4-piperidyl)-pyrrolidin-2,5-dione (Cyasorb® UV3581); and 3-dodecyl-1-(1,2,2,6,6-pentamethyl-4-piperidyl)-pyrrolidin-2,5-dione. In certain embodiments, the low molecular weight hindered amine light stabilizer includes at least one piperidine functional group, and more preferably the hindered amine light stabilizer includes at least one polyalkyl substituted piperidine functional group, and even more preferably the hindered amine light stabilizer is bis-(2,2,6,6-tetramethyl-4-piperidinyl)-decanedioate (Tinuvin® 770).

In certain embodiments, the high molecular weight HALS is selected from 1,3,5-triazine-2,4,6-triamine; N',N'''-(ethanediylbis-(4,6-bis-(butyl(1,2,2,6,6-pentamethyl-4-piperidinyl-amino)-1,3,5-triazine-2-yl)-iminopropanedil)-N', N''-dibutyl-N',N''-bis-(1,2,2,6,6-pentamethyl-4-piperidinyl); poly-methylpropyl-3-oxy-4-(2,2,6,6-tetramethyl-piperidinyl-siloxane; octa-decene-(N-(2,2,6,6-tetramethylpiperidinyl-4-N-maleic imido oxalic acid diamide) copolymer; and poly-(6-morpholine-S-triazine-2,4-diyl)-2,2,6,6-tetramethyl-4-piperidinyl)-hexa-methylene-2,2,6,6-tetramethyl-4-piperidinyl)-imino. Preferably, the high molecular weight hindered amine light stabilizer is poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]](Chimassorb® 944).

In certain embodiments, the high molecular weight HALS has a molecular weight that is at least about two times greater than the molecular weight of the low molecular weight HALS. In certain other embodiments, the high molecular weight HALS has a molecular weight that is at least about three times greater than the molecular weight of the low molecular weight HALS Antioxidant Additives Antioxidants present in the polypropylene resin help to prevent oxidation of products produced therefrom. Exemplary antioxidants can include sterically hindered phenols, phosphites and phosphonites. In certain embodiments, at least two antioxidants can be included in the polypropylene resin. In certain other embodiments, the polypropylene resin can include two antioxidants. In certain embodiments, the first antioxidant can be selected from a hindered phenolic antioxidant and the second antioxidant can be selected from phosphite ester antioxidant.

In certain embodiments, the antioxidant can be a phenolic based antioxidant. Exemplary phenolic antioxidants can include alkylated monophenols, alkylthiomethylphenols, hydroquinones and alkylated hydroquinones, tocopherols, hydroxylated thiodiphenyl ethers, alkylidene bisphenols, O-, N- and S-benzyl compounds, hydroxybenzylated malonates, hydroxybenzyl aromatic compounds, triazine compounds, benzylphosphonates, acylaminophenols, esters of β-(3,5-di-tert-butyl-4-hydroxyphenyl)propionic acid with monohydric or polyhydric alcohols, esters of β-(5-tert-butyl-4-hydroxy-3-methylphenyl)propionic acid with monohydric or polyhydric alcohols, esters of β-(3,5-dicyclohexyl-4-hydroxyphenyl)propionic acid with monohydric or polyhydric alcohols, esters of 3,5-di-tert-butyl-4-hydroxyphenylacetic acid with monohydric or polyhydric alcohols, and amides of β-(3,5-di-tert-butyl-4-hydroxyphenyl)propionic acid.

Specific antioxidants that may be used with the present composition include: 2,6-di-t-butyl-4-methylphenol; 2,6-di-t-butyl-4-ethylphenol; octadecyl 3,5-di-t-butyl-4-hydroxyhydrocinnamate (Irganox® 1076); benzenepropanoic acid, 3,5-bis(11,1-dimethylethyl)-4-hydroxy-methyl ester (Ralox 35); benzenepropanoic acid, 3,5-bis(1,1-dimethylethyl)-4-hydroxy-isooctyl ester (Irganox® 1135); benzenepropanoic acid, 3,5-bis(1,1-dimethyl ethyl)$_4$-hydroxy-C$_{13-15}$ branched and linear alkyl esters (Anox® BF); benzenepropanoic acid, 3,5-bis(1,1-dimethylethyl)-4-hydroxy; 2,2'-methylenebis(6-t-butyl-4-methylphenol) (Cyanox® 2246); 2,2'-methylenebis 6-(1-methylcyclohexyl)-p-cresol (Lowinbx® WSP); 4,4'-butylidenebis(6-t-butyl-3-methyl-phenol) (Santhowhite® powder); 1,1,3-tris(2-methyl-4-hydroxy-5-t-butyl phenyl) butane (Topanol®) CA); N,N'-hexamethylene bis(3,5-di-t-butyl-4-hydroxyhydrocinnamide (Irganox®) 1098); 2,2'-ethylidenebis (4,6-di-t-butylphenol) (Isonox® 129); 4,4'-methylenebis(2,6-di-t-butylphenol) (Ethanox 702); tri-ethyleneglycol-bis-3-(t-butyl-4-hydroxy-5-methyl-phenyl)-propionate (Irganox® 245); 1,6-hexane-diol-bis-3-(3,5-di-t-butyl-4-hydroxyphenyl)-propionate (Irganox® 259); butylated hydroxyanisole (Teenox® BHA); 2,6-di-t-butyl-4-sec-butyl-phenol (Isonox® 132); 2,6-di-t-butyl-4-n-butyl-phenol; 2,6-di-t-butyl-4-nonyl-phenol (Isonox® 232); 2,6-di-methyl-6-(1-methyl-cyclohexyl)-phenol (Lowinox® WSL); 2,4-di-methyl-6-(1-methyl-6-(1-methyl pentadecyl)-2-propyleneacid, 2-isopentane-6-[(3-isopentane-2-hydroxy-5-isopentane-phenyl)-ethyl]-4-methyl-phenyl-ester (Sumilizer® GS); 2-propylene-acid,2-t-butyl-6-[(3-t-butyl-2-hydroxy-5-methyl-phenyl)-methyl]4-methyl-phenyl-ester (Sumilizer® GM); di-ethyl-ester of 3,5-di-t-butyl-4-hydroxy-benzyl-phosphoric acid (Irganox® 1222); 2,5,7,8-tetra-methyl-2-(4',8',12'-tri-methyl-tri-decyl)-6-chromanol (Ronotec® 201); N,N'-1,3-propanediylbis(3,5-di-t-butyl-4-hydroxyhydrocinnamide); calcium bis[monoethyl(3,5-di-t-butyl-4-hydroxy benzyl)phosphonate (Irganox® 1425).

In certain embodiments, the hindered phenolic antioxidant can be pentaerythritol tetrakis(3,5-di-tert-butyl-4-hydroxyhydrocinnamate). In certain embodiments, the antioxidant can be octadecyl 3,5-di-tert-butyl-4-hydroxyhydrocinnamate. In certain embodiments, the phosphite ester antioxidant can be tris-(2,4-di-tert-butylphenyl) phosphite.

As described herein, the polypropylene resin can include at least one antioxidant and at least one HALS. The combination of antioxidants, HALS and phosphites can result in an overall synergistic effect, thereby increasing the overall stability and lifetime of articles prepared therefrom. For example, in certain embodiments, a low molecular weight HALS (e.g., a piperidine containing compound, such as, Tinuvin® 770) and a high molecular weight HALS (e.g., Chimassorb® 944) can be added to the polypropylene resin. In certain embodiments, by using two or more HALS, the morphological differences of the HALS associated with polymeric, oligomeric and synergistic HALS can result in slightly different pathways to protective reactions against UV damage. This may be linked with rate of interactions and diffusion mechanism of the individual HALS within the resin matrices under various compounding and processing conditions.

In certain embodiments, the total amount of additives added to the polymer resin is less than about 5% by weight. In certain embodiments, the total amount of additives is less than about 3% by weight. In certain embodiments, the total amount of additives is less than about 2% by weight. In certain embodiments, the total amount of additives is less than about 1% by weight.

In certain embodiments, the low molecular weight HALS can be present in an amount of between about 0 and 1% by weight. Preferably the low molecular weight HALS is present in an amount of between about 0 and 0.2% by weight, between about 0.2 and 0.4% by weight, between about 0.4 and 0.6% by weight, between about 0.6 and 0.8% by weight, between about 0.25 and 0.75% by weight, and between about 0.8 and 0.9% by weight.

In certain embodiments, the high molecular weight HALS can be present in an amount of between about 0 and 1% by weight. In certain embodiments, the high molecular weight HALS is present in an amount of between about 0 and 0.2% by weight. In other embodiments, the high molecular weight HALS is present in an amount between about 0.2 and 0.4% by weight. In other embodiments, the high molecular weight HALS is present in an amount between about 0.4 and 0.6% by weight. In other embodiments, the high molecular weight HALS is present in an amount between about 0.6 and 0.8% by weight. In other embodiments, the high molecular weight HALS is present in an amount between about 0.25 and 0.75% by weight. In other embodiments, the high molecular weight HALS is present in an amount between about 0.8 and 0.9% by weight. In certain embodiments, the high molecular weight HALS is present in an amount less than about 0.25% by weight. In other embodiments, the high molecular weight HALS is present in an amount less than about 0.2% by weight. In other embodiments, the high molecular weight HALS is present in an amount less than about 0.15% by weight. In other embodiments, the high molecular weight HALS is present in an amount less than about 0.1% by weight.

In certain embodiments, the low molecular weight HALS can be present in an amount at least about 3 times greater than the amount of high molecular weight HALS. In certain embodiments, the low molecular weight HALS:high molecular weight HALS ratio can be at least about 5, at least about 6, or at least about 7. In certain embodiments, the low molecular weight HALS:high molecular weight HALS ratio is between about 5 and 10. In certain embodiments, the low molecular weight HALS:high molecular weight HALS ratio is between about 5 and 7. In certain embodiments the low molecular weight HALS:high molecular weight HALS ratio is about 7.

In certain embodiments, the first antioxidant can be present in an amount of between about 0 and 1% by weight. In other embodiments, the first antioxidant is present in an amount of between about 0 and 0.5% by weight. In yet other embodiments, the first antioxidant is present in an amount between about 0 and 0.1% by weight.

In certain embodiments, the second antioxidant can be present in an amount of between about 0 and 1% by weight. In other embodiments, the second antioxidant is present in an amount of between about 0 and 0.5% by weight. In yet other embodiments, the second antioxidant is present in an amount between about 0 and 0.1% by weight.

In certain embodiments, calcium stearate, or a like compound, can be present in an amount between about 0 and 1% by weight. More preferably, calcium stearate can be present in an amount between about 0 and 0.5% by weight. In other embodiments, calcium stearate can be present in an amount between about 0 and 0.1% by weight.

The polypropylene employed in the various embodiments disclosed can be prepared by any known polymerization technique and with any known polymerization catalyst system. The polymerization reaction can be solution or gas phase polymerizations. Exemplary catalysts can include Ziegler-Natta, metallocene, or (other) single-site catalyst systems. All techniques are known in the art.

The polypropylene resin compositions according to the various embodiments of the present invention can also include known additives and fillers, in addition to the stabilizers and antioxidants disclosed herein. Exemplary additives can include fibers, fillers, lubricants, flame retarding agents, additional rubber(s), etc.

The polypropylene resin compositions according to the various embodiments of the invention can be transformed into shaped (semi-)finished articles using a variety of processing techniques. Exemplary processing techniques include, but are not limited to, injection molding, injection compression molding, in-mould decorating via injection molding, extrusion, and extrusion compression molding.

Preparation of Films from the Polypropylene Resins

Typically, polypropylene films produced from resins having a broad molecular weight distribution have a tensile strength of about 35 MPa. However, when these films are stretched at a ratio of about 1:7, the tensile strength is improved to greater than about 250 MPa, preferably greater than about 300 MPa, and even more preferably greater than about 350 MPa. In certain embodiments, the tensile strength of the polypropylene film is increased by at least a factor of about 5 upon stretching, more preferably by at least a factor of about 7. Even more preferably, upon stretching of the polypropylene film, tensile strength is increased by at least a factor of about 10. In certain embodiments, the increased tensile strength can be partially due to the fact that when the polymer film is stretched, the crystalline region of the polypropylene domain is increased at the expense of the amorphous region.

Thus, polypropylene bags prepared from the polypropylene resins described herein that include a low molecular weight HALS, a high molecular weight HALS and at least two antioxidants demonstrate improved ultraviolet (UV) stability, as compared with polypropylene films that do not include the combination of low and high molecular weight HALS and antioxidants. Typically, the polypropylene resin is stretched to a ratio of at least 1:5 times the original length, preferably about 1:7 times the original length.

After stretching, polypropylene films generally increase in crystalline phase. Thus, upon stretching, the overall amorphous phase present in the polypropylene film is reduced relative to before stretching. As a result, after stretching, the polypropylene films become stronger and have an increased tensile strength. The polypropylene films described herein, having a low and high molecular weight hindered amine light stabilizer and at least two antioxidants, showed an increased tensile strength to approximately 300 MPa after stretching, compared with a tensile strength of about 35 MPa prior to stretching.

Examples

Basic resin polypropylene (PP 500P, coded as A) was obtained from Saudi Arabian Basic Industries Co. (SABIC) and used without further purification. Antioxidants (e.g., Irganox® 1010 and Irgafos® 168) and HALS Tinuvin® 770 (low molecular weight) and Chimassorb® 944 (high molecular weight) were obtained from Ciba Speciality Chemicals Co., and used as received. Calcium stearate having a melting point ranging from 140° C.-160° C., a bulk density 250-310 g/ml and 325 mesh screen was obtained from Esterchem (M) Sdn. Bhd., and used as received.

As shown in Table 1, various exemplary formulations were developed with polypropylene granular resin (PP 500P) in combination with various additives, which were mainly present in powder form and present in an amount of less than 1% of the bulk polymer matrix and are provided in Table 1. A master-batch technique was adopted by mixing about 5 g of the master-batch material to about 100 g of the polypropylene resin to ensure that an appropriate concentration of each desired additive was obtained in the desired formulations at 5 phr basis.

Master-Batch Technique

A carrier LLDPE (linear low density polyethylene) powder, having a density of 0.9182 g/cm$^3$ and MFI (melt flow index) of 0.86 g/10 min was used to make the master-batch. All additives were mixed together with the carrier LLDPE powder resin for half an hour in a high-speed mixer (Model FM 10823 of Mitsui Mining Co. Ltd., Tochigi Engineering Works, Japan) at about 500 rpm and then pelletized by extruding the mixture at a temperature of between about 200° C.-230° C. with an extruder (model L/D 19/25) attached to a Plasticoder (model PL2200), a rod die and a pelletizer from Brabender Co., Germany. A polypropylene resin (PP 500P) was mixed with these master-batch pellets at about 5 phr in a Pascal Lab Mixer (model 1664-00-A, UK) for about one hour at about 50 rpm and then pelletized at a temperature of between about 200° C.-230° C. with the same extruder, rod die and the pelletizer. These pellets were then used for film preparation.

TABLE 1

Formulations with PP500P resin and additives.

| Film code | Antioxidants | | Calcium Stearate (%) | HALS | | Total Additive |
|---|---|---|---|---|---|---|
| | Irganox ® 1010 (%) | Irgafos ® 168 (%) | | Tinuvin ® 770 (%) | Chimassorb ® 944 (%) | |
| A | — | — | — | — | — | 0 |
| A1 | 0.05 | 0.05 | 0.10 | 0.175 | 0.025 | 0.4% wt. |
| A1/1 | 0.05 | 0.05 | 0.10 | 0.35 | 0.05 | 0.6% wt. |
| A1/2 | 0.05 | 0.05 | 0.10 | 0.525 | 0.075 | 0.8% wt. |
| A1/3 | 0.05 | 0.05 | 0.10 | 0.70 | 0.10 | 1.0% wt. |

Film Preparation:

Films (0.450 mm thick) were prepared using the same extruder and a ribbon die at a temperature of between about 220° C. and 250° C. by drawing the melt mixture of the ribbon die through a set of steel drum thermo-stated at about 50° C. These films were stretched at a temperature of about 160° C. to approximately a 1:7 ratio by using Stretching Unit (model Teach-line) of Dr. Collin GmbH Co., Germany. The stretched films were characterized and subjected to accelerated weathering by QUV and natural (outdoor) weathering tests.

Accelerated Weathering by QUV:

This test was conducted for stretched polypropylene films by using a QUV Weathering instrument of Q-UV Panel Lab Products Co., Cleveland, Ohio, USA (model number QUV/Basic). The QUV instrument contains eight fluorescent lamps (model UVA-340) and conforms to ASTM D-4329 standards (standard practice for fluorescent UV exposure of plastics) corresponding to ISO 4892. Samples were removed from the instrument at regular intervals and the tensile strength (TS) of the samples were measured as per ASTM D368 M using a Universal testing machine (model 4505) from Instron, UK. The gauge length of the samples was 2.5 cm and test speed was 50 cm/min. TS retention (%) was evaluated for each sample after each exposure and the test was continued until a retention of 50% of the tensile strength was measured.

Natural (Outdoor) Weathering:

Stretched polypropylene films were cut into dumbbell shapes and mounted on plastic plates (measuring about 12 cm by 8 cm), and were placed on wooden boards positioned at an approximately 45° angle facing southwards. Samples were removed periodically and their tensile properties were tested, according to the procedures described above, until a retention of 50% of the tensile strength was measured.

As shown in FIGS. 1 and 2, most of the samples demonstrate a high resistance to UV degradation under accelerated weathering by a Q-UV machine and natural (outdoor) weathering tests.

As shown in FIG. 1, after exposure to UV radiation for approximately 5500 hours in a Q-UV machine (which is roughly equivalent to approximately 2 years of natural exposure to sunlight), tensile strength retention of a stretched polypropylene film having between about 0.4 and 1% by weight additives was approximately 87%. In comparison, the polypropylene sample having no additives immediately demonstrated a reduction in tensile strength retention.

As shown in FIG. 2, the tensile strength of a stretched polypropylene film after approximately 8 months of natural outdoor exposure exhibited a tensile strength retention of approximately 112%. In contrast, similar to FIG. 1, the polypropylene films with no additives demonstrated an immediate decrease in tensile strength retention, reaching a retention of about 50% in approximately 2 months.

The tensile strength retention (%) is observed around about 100% in the both the tests.

While the present invention has been described with respect to polypropylene resins and articles prepared therefrom, particularly woven jumbo bags, it is understood that the additives described herein and the principles discussed with respect to improved wear resistance, increased UV and thermoxidative stability can also be applied to polymer compositions prepared from other polymer resins, such as for example, but not limited to, polyethylene, polyacetylene, polybutylene and other polyolefins, and various copolymers and blends thereof.

Optional or optionally means that the subsequently described event or circumstances may or may not occur. The description includes instances where the event or circumstance occurs and instances where it does not occur.

As used herein, recitation of the term about and approximately with respect to a range of values should be interpreted to include both the upper and lower end of the recited range.

Ranges may be expressed herein as from about one particular value, and/or to about another particular value. When such a range is expressed, it is to be understood that another embodiment is from the one particular value and/or to the other particular value, along with all combinations within said range.

While the invention has been shown or described in only some of its embodiments, it should be apparent to those skilled in the art that it is not so limited, but is susceptible to various changes without departing from the scope of the invention.

As used in the specification and claims, the singular form "a", "an" and "the" may include plural references, unless the context clearly dictates the singular form.

Although the following detailed description contains many specific details for purposes of illustration, one of ordinary skill in the art will appreciate that many variations and alterations to the following details are within the scope of the invention. Accordingly, the exemplary embodiments of the invention described below are set forth without any loss of generality to, and without imposing limitations thereon, the claimed invention. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Throughout this application, where patents or publications are referenced, the disclosures of these references in their entireties are intended to be incorporated by reference into this application, in order to more fully describe the state of the art to which the invention pertains, except when these references contradict the statements made herein.

We claim:

1. A stretched polypropylene film comprising:
a polypropylene film comprising a polypropylene resin, said polypropylene resin comprising;
polypropylene;
a low molecular weight hindered amine light stabilizer;
a high molecular weight hindered amine light stabilizer;
a first antioxidant; and
a second antioxidant;
wherein said polypropylene film is stretched to a ratio of between approximately 1:7 and 1:5 to produce the stretched polypropylene film.

2. The stretched polypropylene film of claim 1 where in the low molecular weight hindered amine light stabilizer, the high molecular weight hindered amine light stabilizer, the primary antioxidant, the secondary antioxidant, and any other additive are present in an amount of less than 1% of the polypropylene resin by weight.

3. The stretched polypropylene film of claim 1 wherein the polypropylene resin is extruded to produce a polypropylene resin film.

4. The stretched polypropylene film of claim 3 wherein the polypropylene resin is extruded at a temperature of between about 220° and 250° C. to form a polypropylene resin film.

5. The stretched polypropylene film of claim 1 wherein the low molecular weight hindered amine light stabilizer includes a piperidinyl functional group.

6. The stretched polypropylene film of claim 1 wherein the low molecular weight hindered amine light stabilizer is bis-(2,2,6,6-tetramethyl-4-piperidinyl)-decanedioate.

7. The stretched polypropylene film of claim 1 wherein the high molecular weight hindered amine light stabilizer is poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]].

8. The stretched polypropylene film of claim 1 wherein the first antioxidant comprises a hindered phenolic antioxidant.

9. The stretched polypropylene film of claim 1 wherein the first antioxidant is pentaerythritol tetrakis(3,5-di-tert-butyl-4-hydroxyhydrocinnamate).

10. The stretched polypropylene film of claim 1 wherein the second antioxidant comprises a phosphite ester.

11. The stretched polypropylene film of claim 1 wherein the second antioxidant is selected from tris-(2,4-di-tert-butylphenyl)phosphite.

12. A method for preparing a stretched polypropylene film comprising:
extruding a polypropylene resin to form a polypropylene film, wherein the polypropylene film comprises:
a polypropylene polymer;
a low molecular weight hindered amine light stabilizer;
a high molecular weight hindered amine light stabilizer;
a first antioxidant;
a second antioxidant;
stretching the polypropylene film to form the stretched polypropylene film.

13. The method of claim 12 wherein the ratio of low molecular weight hindered amine light stabilizer to high molecular weight hindered amine light stabilizer is between 5:1 and 9:1.

14. The method of claim 12 wherein the ratio of low molecular weight hindered amine light stabilizer to high molecular weight hindered amine light stabilizer is about 7:1.

15. The method of claim 12 wherein the low molecular weight hindered amine light stabilizer, the high molecular weight hindered amine light stabilizer, the primary antioxidant, and the secondary antioxidant are present in the polypropylene resin in an amount less than 1% by weight.

16. The method of claim 12 wherein the low molecular weight hindered amine light stabilizer has a molecular weight less than about 1000 g/mol.

17. The method of claim 12 wherein the high molecular weight hindered amine light stabilizer has a molecular weight greater than about 2000 g/mol.

18. The method of claim 12 wherein the low molecular weight hindered amine light stabilizer is bis-(2,2,6,6-tetramethyl-4-piperidinyl)-decanedioate.

19. The method of claim 12 wherein the high molecular weight hindered amine light stabilizer is poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]].

20. The method of claim 12 wherein the first antioxidant comprises a hindered phenolic antioxidant.

21. The method of claim 12 wherein the first antioxidant is pentaerythritol tetrakis(3,5-di-tert-butyl-4-hydroxyhydrocinnamate).

22. The method of claim 12 wherein the second antioxidant comprises a phosphite ester.

23. The method of claim 12 wherein the second antioxidant is tris-(2,4-di-tert-butylphenyl)phosphite.

24. The method of claim 12 wherein extruding the polypropylene resin is at a temperature of between about 220° and 250° C.

25. The method of claim 12 wherein the polypropylene tape is prepared by stretching the polypropylene film at a ratio of 1:7.

* * * * *